United States Patent [19]

Tantlinger

[11] 4,108,488

[45] Aug. 22, 1978

[54] VEHICLE FRONT HAVING ASYMMETRICAL WINDSHIELDS

[75] Inventor: Keith W. Tantlinger, Coronada, Calif.

[73] Assignee: Rohr Industries, Incorporated, Chula Vista, Calif.

[21] Appl. No.: 784,954

[22] Filed: Apr. 6, 1977

[51] Int. Cl.² .............................. B60J 1/06; B60R 1/00
[52] U.S. Cl. .................................. 296/84 R; 296/97 F; 350/276 R
[58] Field of Search ................ 296/84 R, 28 A, 28 C, 296/97 E, 97 F, 146; 350/276 R; D12/84, 182

[56] References Cited

U.S. PATENT DOCUMENTS 2,289,144  7/1942  Rossell et al. ..................... 296/97 E
2,833,590  5/1958  Zimmerman ....................... 296/84 R Primary Examiner—Joseph F. Peters, Jr.
Assistant Examiner—Donn McGiehan
Attorney, Agent, or Firm—Patrick J. Schlesinger; Frank D. Gilliam; Charles C. Logan

[57] ABSTRACT

An improved windshield for a transit vehicle. The windshield comprises a pair of windshield sections horizontally separated by a vertical divider. Each of the windshield sections are positioned at different angles from a common vertical axis whereby at night the interior lighting of the vehicle is reflected rearwardly from the interior surface of the windshield section in a manner which prevents interference with the forward vision of the operator through the windshield sections.

9 Claims, 6 Drawing Figures

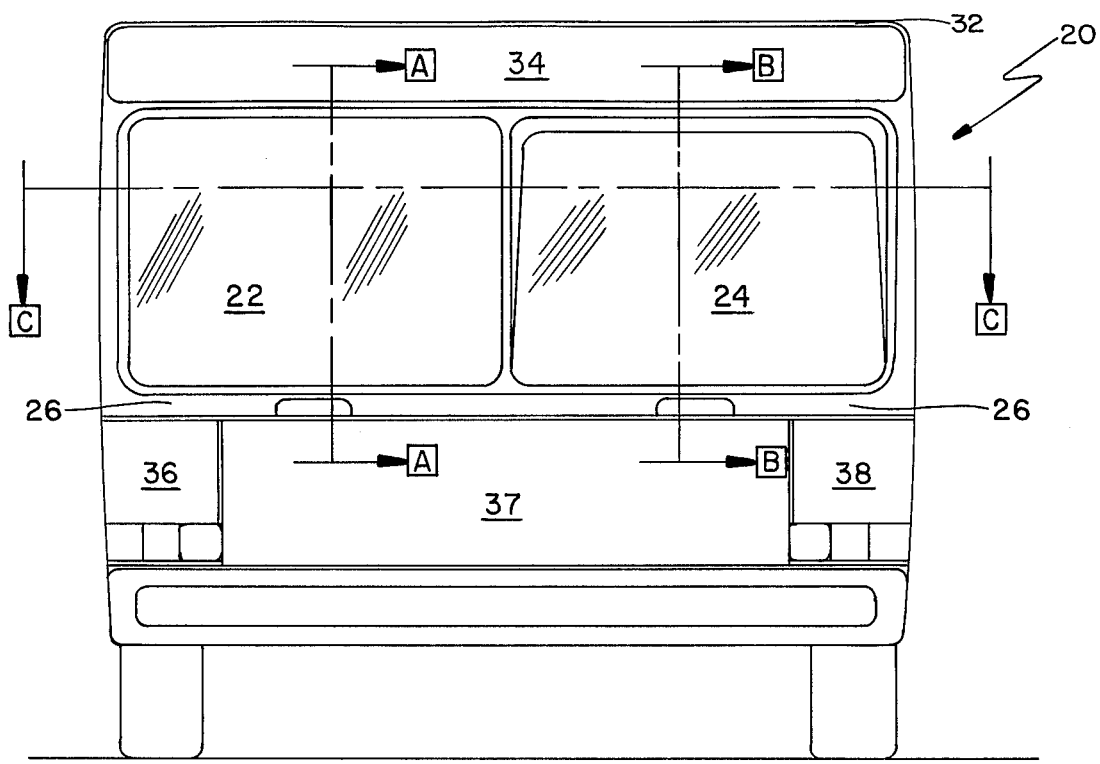
FIG. 3
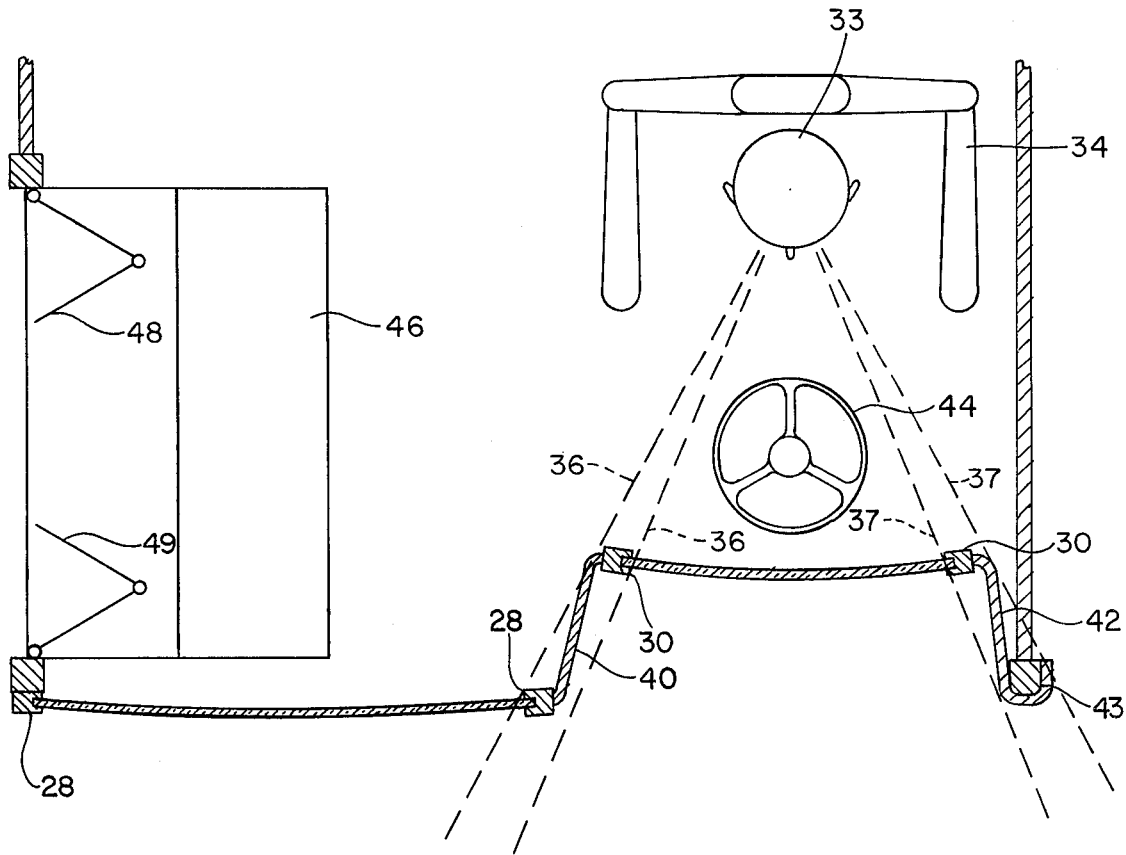
FIG. 4  SECTION C-C

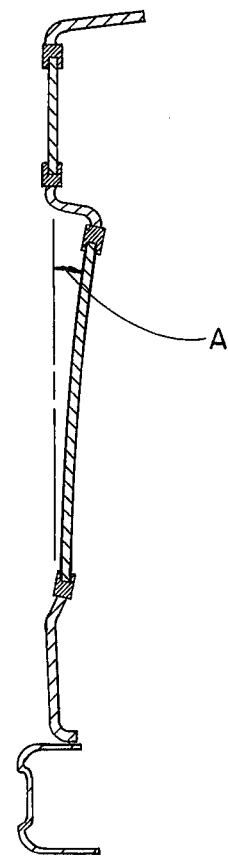
FIG.5  SECTION A-A
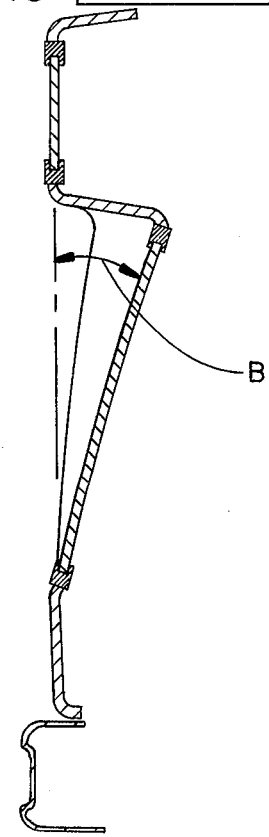
FIG.6  SECTION B-B

VEHICLE FRONT HAVING ASYMMETRICAL WINDSHIELDS

BACKGROUND OF THE INVENTION

The present invention relates generally to a new and improved windshield arrangement particularly adapted for use in operator driven vehicles, particularly passenger carrying vehicles, such as buses which are equipped with overhead interior lighting systems.

Present day passenger carrying vehicles generally have windshields that extend across the full width of the front of the vehicle. The full width windshield provides the operator of the vehicle with a wide range of vision thereby allowing the vehicle to be operated with a greater degree of safety. With this use of the full width windshield, the difficulties accompanying night driving are increased due to the large area of the windshield acting as a reflective surface with respect to the overhead lighting system used in the interior of the vehicle. The sources of light within the vehicle contact the windshield so as to cause a reflection of images of various objects within the vehicle on the inner surface of the windshield. The reflection of these images interfere with the clearness of observation from the operator's seat and tends to produce blinding or distracting effects in the operator's line of vision. This is particularly true when the vehicle is operated in dark areas such as residential areas or country roads.

Efforts have been made to overcome this particular problem and such efforts have included, for example, the use of a dark curtain placed directly behind the driver's seat. This form of protective measure aids the operator only by cutting down the reflections on that portion of the windshield immediately in front of the driver. However, the remaining portion of the windshield is unprotected and the illumination from the interior of the vehicle casts images upon the unprotected portion and in effect materially reduces the advantageous use of this portion of the windshield by the operator.

Operators of passenger carrying vehicles which tend to travel through dark country areas have resorted to the necessity of reducing the amount of interior illumination within the vehicle while retaining illumination of a degree adequate to satisfy safety regulations. As a result, passengers are unable to read and a principal means of reducing the tedium of long trips is unavailable for use. To overcome this problem, vehicle manufacturers have gone to great expense on personal reading lights which direct a restricted beam of light in a limited area so as not to interfere with the operator's vision. Such installations are expensive, not only with respect to original costs but also from the standpoint of maintenance. Also, although the problem of direct shining of the lights on the interior of the front windshield has been eliminated, the reflected light that bounces off the passengers and other structures within the bus continue to pose a problem for the driver.

One manner of reducing the amount of reflected light from overhead interior lights and light reflection off passenger's faces and clothing would be to tilt the front windshield rearwardly with such a sufficient angle that direct light from the bus interior lights would be reflected downwardly below the driver's field of vision as would light reflections off the passenger's faces and clothing. The problem with this solution is that this would cause the entry door to be located rearwardly from its original position thus causing the bus to overhang its front axle too far. The result is that the front end of the bus is susceptible to scraping damage on ramps. Since door widths should be as wide as possible, there is not enough room for a steeply sloped windshield and an entry door of adequate width forward of the steering axle.

It is an object of the present invention to provide a reflection-proof windshield for the operator of a transit vehicle.

It is also an object of the present invention to provide a wider entry door for the passenger and at the same time eliminating the interior reflection glare problem for the vehicle operator.

It is also an object of the present invention to provide a transit vehicle front end having two windshields wherein the divider between them is oriented such that its orientation in the line of the vehicle operator's line of sight would not obscure the driver's field of vision any more than a conventional divider strip.

It is a further object of the invention to provide a design for the front end of a transit vehicle that better utilizes its space.

SUMMARY OF THE INVENTION

The novel transit vehicle front end has a steering wheel and a driver's seat conventionally located in the front end of the vehicle. A pair of windshields are mounted in the front end of the vehicle with one of the windshields positioned forwardly of the steering wheel and being referred to as the driver's windshield with the other windshield positioned laterally adjacent thereto and being referred to as the second windshield. The driver's windshield and the second windshield are tilted rearwardly at different angles from a vertical axis whereby light from the interior light and light reflection from passenger's faces and clothing is reflected rearwardly from the interior surface of the windshields at different angles. The driver's windshield is tilted rearwardly at a greater angle than the second windshield. The angle that the driver's windshield makes with a vertical axis would be greater than 18°. With this degree of inclination, the overhead interior light and light reflections from the passenger's faces and clothing is directed downwardly below the driver's field of vision. The second windshield is tilted rearwardly approximately 6° with respect to a vertical axis. This allows the front entry door of a present day transit vehicle to be moved forwardly several inches and the utilization of the these several inches to be incorporated into a wider front entry door.

The driver's windshield and the second windshield are asymmetrical. Both windshields have a convex outer surface in the horizontal plane. The two windshields have a window surround frame for mounting the windshield in the front end of a transit vehicle. A vertical divider forms a part of this window surround frame as does a vertical member that forms the vertical edge of the frame along the outer edge of the driver's windshield. The vertical divider and the vertical member each have a dimension in the longitudinal direction of the bus. It starts out small at their lower edges and grows continually larger until they reach their upper edges for supporting the rearwardly tilted driver's windshield. The top of the driver's windshield is therefore, in effect, recessed from the front end of the bus. The angles at which the vertical divider and the vertical member depend rearwardly from the front end of the bus have a special relationship with respect to the location of the driver's seat. This relationship is explained by taking a horizontal plane through the front end of the bus at a height approximating that of the driver's head. A pair of straight lines are then drawn from the driver's right eye area tangent the edge of the window gasket located along the left side of the driver's window and the rear edge of the vertical divider, respectively, and these lines are extended rearwardly. A seond pair of straight lines are then drawn through the driver's left eye area tangent the edge of the window gasket located along the right side of the driver's window and the near right edge of the vertical member, respectively, and these lines are extended rearwardly. These four lines will intercept approximately within the center of the driver's head. The result produced is a minimizing of the amount that the vertical divider and the vertical member will obscure the vehicle operator's line of sight. In effect, the divider's presence would obscure no more of the driver's field vision than a conventional windshield divider strip.

DESCRIPTION OF THE DRAWINGS

FIG. 3 is a front elevation view of applicant's novel transit vehicle front end.

FIG. 4 is a schematic view taken along lines C—C of FIG. 3.

FIG. 5 is a cross section view taken along lines A—A of FIG. 3.

FIG. 6 is a cross section view taken along lines B—B of FIG. 3.

DESCRIPTION OF A PREFERRED EMBODIMENT

Figure 1:
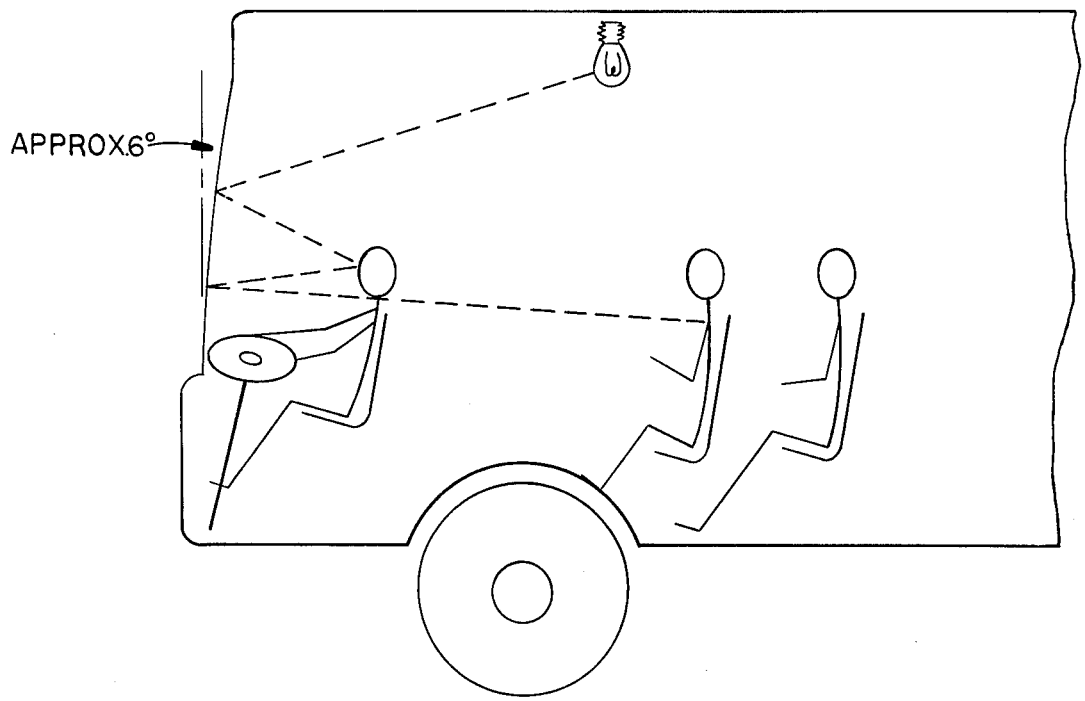
FIG. 1 is a schematic illustration of a present day transit vehicle front end showing the manner in which light from the vehicle overhead interior lights and light reflections off passenger's faces and clothing reflect into the vehicle operator's eyes.

Referring to FIG. 1, the problem in present day transit vehicle front windshield reflections is illustrated. This schematic figure shows a front window of a present day transit vehicle wherein the rearward inclination angle A is approximately 6°. With this rearward slope to the front window, light shining directly from the overhead interior lights and also light reflections from the passenger's faces and clothing and empty seats reflect into the vehicle operator's eyes.

Figure 2:
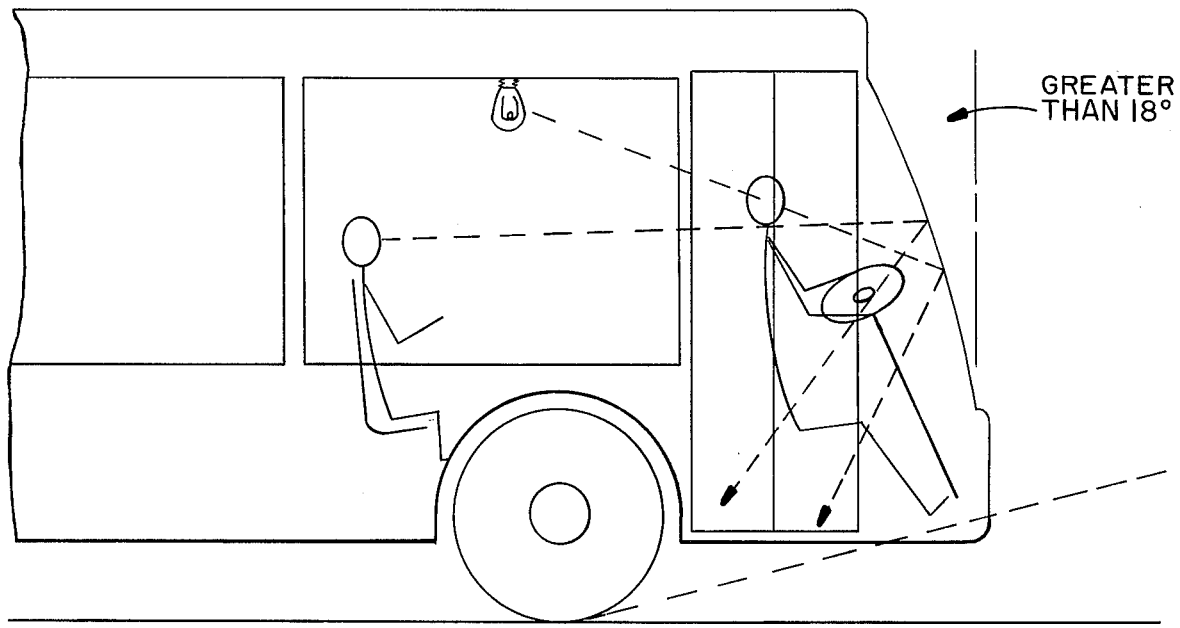
FIG. 2 is a schematic illustration of a transit vehicle front end showing the problem that would be produced by merely tilting rearwardly a one piece front windshield for the transit vehicle.

The condition described above is most pronounced when driving at night. For the best operator visibility at night, the windshield should be steeply sloped rearwardly with respect to the operator's line of sight such as illustrated in FIG. 2. This schematic illustration shows that if the front windshield is sloped rearwardly at an angle B greater than 18°, direct light from the overhead interior lights and also light reflections from the passenger's faces and clothing will be reflected from the front windshield below the operator's line of sight. This type of solution, however, produces other problems. By sloping the front windshield to such a great degree, the entry door is necessarily moved rearwardly. Due to the necessity of maintaining the standard width to the front entry door, the bus front end would have to overhang its front axle too far and this would make it susceptible to scraping damage on ramps (see ramp clearance Angle C). As can be fully appreciated from the schematic illustration, this solution would not be adequate.

The novel transit vehicle front end is illustrated in FIGS. 3 through 6. As can be seen in FIG. 3, a transit vehicle front end is illustrated having two front windshields. The front end of the transit vehicle is generally designated numeral 20. It has windows 22 and 24 and they are asymmetrical. These windshields are mounted in a window surround frame 26 by gaskets 28 and 30, respectively. The front of the transit vehicle also has a fiberglass cap 32 within which the destination sign 34 is mounted. Access panels 36, 37 and 38 are mounted below the windshields on the front end of the vehicle.

The front end of the vehicle represented in FIG. 4 is a horizontal schematic taken at a height approximating that of the vehicle operator's head. The operator's head 32 is portrayed as being centrally located within the driver seat 34, and the special relationship that the operator's head has with respect to the driver's windshield is emphasized by dotted lines 36 and 37 which portray the driver's line of sight. Dotted lines 36 pass tangent the edge of window seal gasket 30 located along the left side of driver's window 24 and the near left edge of vertical divider 40, respectively. The other lines of sight, dotted lines 37, pass tangent the edge of window gasket 30 located along the right side of the driver's window 24 and the near right edge of vertical member 42, respectively. Other structures identified in FIG. 4 are the steering wheel 44, the front step well 46, and the front folding door sections 48 and 49.

FIG. 5 is a vertical cross section taken along the right front windshield of the bus. It can be seen that this windshield is sloped rearwardly at an angle A with respect to a vertical axis. The amount of rearward slope for this window is in the order of 6°.

The vertical cross section in FIG. 6 illustrates the driver's windshield. The driver's windshield is tilted rearwardly at an angle B which is at least 18° with respect to the vertical axis. This results in the top of the driver's windshield being recessed from the front contour of the bus.

Having thus described the invention, what is claimed as new and useful and desired to be secured by United States Letters Patent is:

1. A transit vehicle having an improved front end structure comprising:
  a front end having a steering wheel and a driver's seat,
  a pair of windshields mounted in said front end, one of said windshields positioned forwardly of the steering wheel and being referred to as the first or driver's windshield, the other windshield positioned laterally adjacent said first windshield and being referred to as the second windshield,
  a vertical divider is mounted between said first and second windshields,
  said first and second windshields being at different angles from a vertical axis whereby light from the interior lights and light reflections from passenger faces and clothing is reflected rearwardly from the interior surface of said windshields at different angles.

2. A transit vehicle as recited in claim 1 wherein said first and second windshields are asymmetrical.

3. A transit vehicle as recited in claim 1 wherein said first windshield has a convex outer surface in the horizontal plane.

4. A transit vehicle as recited in claim 1 wherein said second windshield has a convex outer surface in the horizontal plane.

5. A transit vehicle as recited in claim 1 wherein said first windshield is tilted rearwardly from the vertical axis.

6. A transit vehicle as recited in claim 1 wherein both said first and second windshields are tilted rearwardly from the vertical axis.

7. A transit vehicle as recited in claim 1 where the difference between the angles said first and second windshields make with their vertical axes is at least 6°.

8. A transit vehicle as recited in claim 1 wherein said first and second windshields have a window surround frame for mounting said windshields in the front end of said transit vehicle, said vertical divider being a part of said window surround frame, said window surround frame having a vertical member that forms the vertical edge of said frame along the outer edge of the driver's windshield;

said vertical divider and said vertical member each having a dimension in the longitudinal direction of the bus that starts out small at their lower edges and grows continually larger until they reach their upper edges for supporting said rearwardly tilted driver's windshield;

said first and second windshields having seal members for mounting said windshields in said window surround frame.

9. A transit vehicle as recited in claim 8 wherein the angles at which the vertical divider and said vertical member depend rearwardly from the front end of the bus have a special relationship with respect to the location of said driver's seat such that when a horizontal plane is taken through said front end of the bus at a height approximating that of the driver's head, a pair of straight lines drawn from the driver's right eye area tangent the edge of the window gasket located along the left side of said driver's window and the near left edge of said vertical divider, respectively, if extended, will intercept the driver's head at approximately the same point that a pair of straight lines drawn through the driver's left eye area tangent the edge of the window gasket located along the right side of said driver's window and the near right edge of said vertical member, respectively, if extended, thereby minimizing the amount that said vertical divider and said vertical member obscure the vehicle operator's line of sight.

* * * * *